(12) United States Patent
Osberger

(10) Patent No.: US 6,670,963 B2
(45) Date of Patent: Dec. 30, 2003

(54) VISUAL ATTENTION MODEL

(75) Inventor: Wilfried M. Osberger, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 271 days.

(21) Appl. No.: 09/764,726

(22) Filed: Jan. 17, 2001

(65) Prior Publication Data

US 2002/0126891 A1 Sep. 12, 2002

(51) Int. Cl.$^7$ .................................................. G09G 5/00
(52) U.S. Cl. ........................ 345/629; 345/582; 345/589; 345/620; 382/164; 382/173; 382/180
(58) Field of Search ................................. 345/419, 582, 345/426, 589, 423, 629, 620; 340/995; 375/240.16; 382/154, 239, 269, 164, 165, 107, 170, 173, 180

(56) References Cited

U.S. PATENT DOCUMENTS 6,442,203 B1 * 8/2002 Demos .................. 375/240.16

OTHER PUBLICATIONS

Chang et al. "VideoQ: An Automated Content Based Vido Search System Using Visual Cues", ACM Multimedia 97 Seattle Washington USA, pp. 313–324.*
Osberger et al., "A perceptually Based Quantization Technique for MPEG Encoding", SPIE Conference Jan. 1998.*
Vleeschouwer et al. "A fuzzy Logic System Able to Detect Interesting Areas of a Video Sequence", SPIE vol. 3016, 1997, pp. 234–245.*
Osberger et al. "Automatic Identification of Perceptually Important Regions in an Image", IEEE, Aug. 1998.*
Wilfried Osberger & Anthony .J. Maeder, "Automatic Identification of Perceptually Important Regions in an Image", IEEE: 14$^{th}$ Conference on Pattern Recognition, Aug. 1998.

Wilfried Osberger, Anthony .J. Maeder & Neil Bergmann, "A Perceptually Based Quantization Technique for MPEG Encoding", SPIE 3299 Conference, Jan. 1998.
C. De Vleeschouwer, X. Marichal, T. Delmot & B. Macq, "A Fuzzy Logic System Able to Detect Interesting Areas of a Video Sequence", SPIE vol. 3016.
Stephen P. Etz & Jiebo Luo, "Ground Truth for Training and Evaluation of Automatic Main Subject Detection", SPIE 3959 Human Vision & Electronic Imaging V, Jan. 2000.
Laurent Itti, Christof Koch & Ernst Niebur, "A Model of Saliency–Based Visual Attention for Rapid Scene Analysis", IEEE Transactions on Pattern Analysis and Machine Intelligence, vol. 20, No. 11, Nov. 1998.
Jiying Zhao, Yoshihisa Shimazu, Koji Ohta, Rina Hayasaka & Yutaka Matsushita, "An Outstandingness Oriented Image Segmentation and Its Application", ISSPA, Aug. 1996.
Anthony Maeder, Joachim Diederich & Ernst Niebur, "Limiting Human Perception for Image Sequences", SPIE vol. 2657.

* cited by examiner

Primary Examiner—Mark Zimmerman
Assistant Examiner—Kimbinh T. Nguyen
(74) Attorney, Agent, or Firm—Francis I. Gray

(57) ABSTRACT

An improved visual attention model uses a robust adaptive segmentation algorithm to divide a current frame of a video sequence into a plurality of regions based upon both color and luminance, with each region being processed in parallel by a plurality of spatial feature algorithms including color and skin to produce respective spatial importance maps. The current frame and a previous frame are also processed to produce motion vectors for each block of the current frame, the motion vectors being compensated for camera motion, and the compensated motion vectors being converted to produce a temporal importance map. The spatial and temporal importance maps are combined using weighting based upon eye movement studies.

20 Claims, 4 Drawing Sheets

VISUAL ATTENTION MODEL

BACKGROUND OF THE INVENTION

The present invention relates to analysis of video quality, and more particularly to an improved visual attention model for automatically determining regions of interest within images of a video signal.

Models of early visual systems that are tuned appropriately provide accurate predictions of the location of visible distortions in compressed natural images. To produce an estimate of subjective quality from fidelity maps, current state-of-the-art quality metrics perform a simple summation of all visible errors. This fails to take into account any higher level or cognitive factors that are known to occur during the subjective assessment of picture quality.

The influence that a distortion has on overall picture quality is known to be strongly influenced by its location with respect to scene content. The variable resolution nature of the Human Visual System (HVS) means that high acuity is only available in the fovea, which has a diameter of about 2 degrees. Knowledge of a scene is obtained through regular eye movements to reposition the area under foveal view. Early vision models assume an "infinite fovea", i.e., the scene is processed under the assumption that all areas are viewed by the high acuity fovea. However studies of eye movements indicate that viewers do not foveate all areas in a scene equally. Instead a few areas are identified as regions of interest (ROIs) by human visual attention processes and viewers tend to repeatedly return to these ROIs rather than other areas that have not yet been foveated. The fidelity of the picture in these ROIs is known to have the strongest influence on overall picture quality.

The knowledge of human visual attention and eye movements, coupled with selective and correlated eye movement patterns of subjects when viewing natural scenes, provides a framework for the development of computational models of human visual attention. The studies have shown that people's attention is influenced by a number of different features that are present in the picture—motion, luminance contrast, color contrast, object size, object shape, people and faces, location within the scene, and whether the object is part of the foreground or background. A handful of simple visual attention models have been proposed in the literature. These models aim to detect the ROIs in a scene in an unsupervised manner. They have generally been designed for use with uncomplicated still images. A number of deficiencies are apparent in these models which prevent their use as robust attention models for typical entertainment video. These include: the limited number of attention features used; the failure to apply different weights to the different features; the lack of robustness in segmentation techniques; the absence of a temporal model; and the oversimplified algorithms used to extract the attention features. None of the proposed models have been demonstrated to work robustly across a wide range of picture content and their correlation to people's eye movements has not been reported.

As indicated in the paper entitled "A Perceptually Based Quantization Technique for MPEG Encoding", *Proceedings SPIE 3299—Human Vision and Electronic Imaging III*, San Jose, USA, pp. 48–159, 26–29 January 1998 by Wilfried Osberger, Anthony J. Maeder and Neil Bergmann, a technique is disclosed for automatically determining the visually important areas in a scene as Importance Maps (IMs). These maps are generated by combining factors known to influence human visual attention and eye movements, as indicated above. For encoding lower quantization is assigned to visually important areas and areas of lesser visual importance have a harsher quantization assigned. Results indicate a subjective improvement in picture quality.

In this prior technique segmentation is performed using a classic recursive split-and-merge segmentation. After segmentation the results were processed by five spatial features to produce individual spatial importance maps: contrast; size; shape; location and background. Motion also was taken into consideration to produce a temporal importance map. Each of these individual importance maps were squared to enhance areas of high importance and then weighted equally to produce a final IM. However it was felt that this technique was not robust enough.

What is desired is an automatic way to predict where ROIs are likely to be located in a natural scene of a typical entertainment video using the properties of human attention and eye movements that is more robust than prior techniques.

BRIEF SUMMARY OF THE INVENTION

Accordingly the present invention provides method for automatically identifying regions of interest in a video picture using a visual attention model. A current frame is adaptively segmented into regions based upon both color and luminance. Each region is processed in parallel by a plurality of spatial feature algorithms including color and skin to produce respective spatial importance maps. The spatial importance maps are combined to produce an overall spatial importance map, the combining being based upon weights derived from eye movement studies. The current frame and a previous frame also are processed to produce motion vectors for the current frame, after which the motion vectors are corrected for camera motion before being converted into a temporal importance map. The overall spatial importance map and the temporal importance map are combined by linear weighting to produce a total importance map for the current frame, with the linear weighting constant being derived from the eye motion studies.

The objects, advantages and other novel features of the present invention are apparent from the following detailed description when read in conjunction with the appended claims and attached drawing.

DETAILED DESCRIPTION OF THE INVENTION

Figure 1:
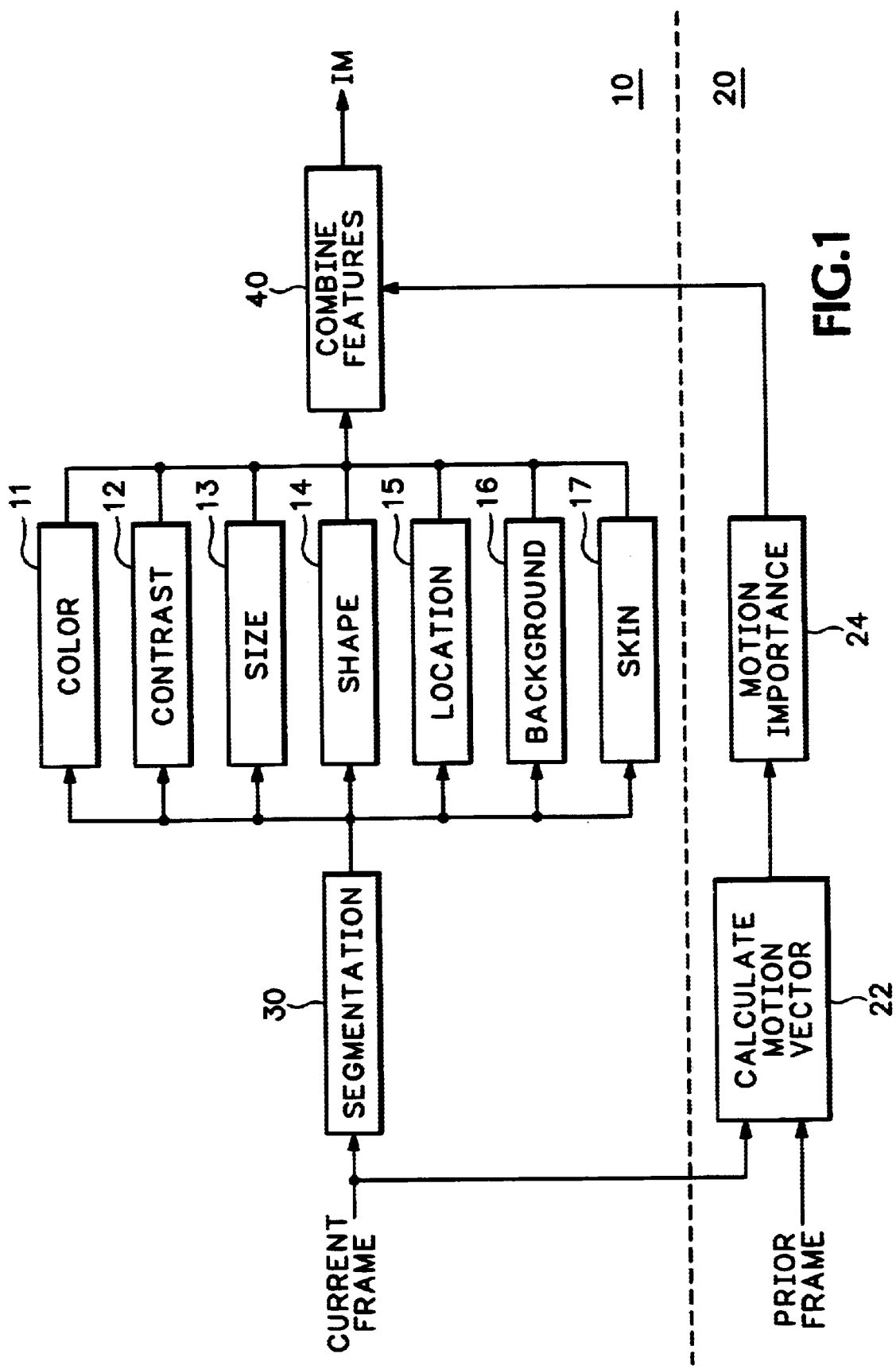
FIG. 1 is a block diagram view of an improved visual attention model according to the present invention.

An importance map (IM) technique is described here which is based on a region-based attention model. The region-based attention model makes it easier to include a large number of features in the model because many features that influence attention are either inherent properties of regions, such as size and shape, or can naturally be associated with whole objects in a scene, such as motion, color, contrast and texture. Referring now to FIG. 1 a visual attention model is shown having a spatial attention model 10 and a temporal attention model 20. The spatial model has a current frame of video as an input. This image is first segmented by a segmentation algorithm 30 into homogeneous regions using both luminance and color information. The importance of each region with respect to seven features 11–17, including color, contrast, size, shape, location, background and skin, that are known to influence visual attention is then calculated. The flexible nature of the feature image processing algorithms allows additional features to be easily incorporated. The features are weighted based on a calibration with people's eye movements which have been gathered from an experiment on people's eye movements. The feature weights are then input to a combination algorithm 40 to produce a spatial importance map (IM) for the scene of the current frame.

In parallel the motion model 20 has the current frame and a prior frame as inputs to a motion vector algorithm 22. The motion vectors from the motion vector algorithm 20 are then weighted by a motion importance algorithm 24 for each object in the scene based on the magnitude of its motion. The motion weights also are combined with the spatial weights using data gathered from the eye tracker experiments to produce an overall IM for the current frame.

Figure 2A:
FIG. 2(a) is an image view of a current frame and FIG. 2(b) is a total importance map for the image view obtained according to the present invention.
Figure 2B:
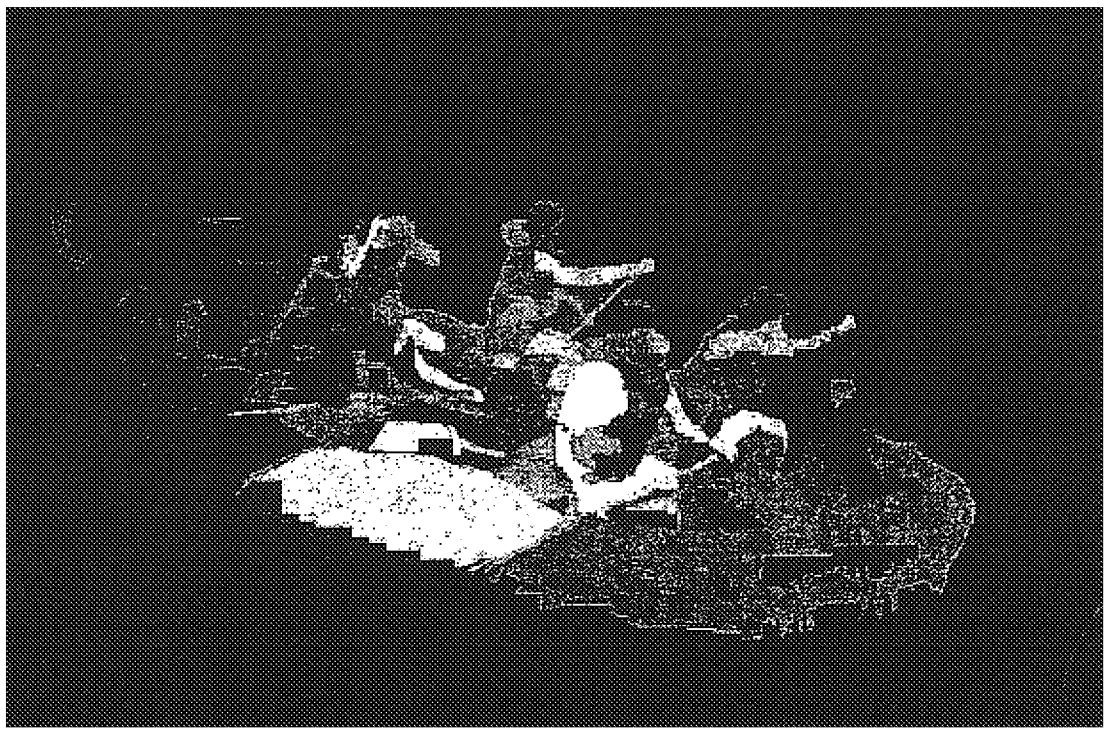

A current frame is shown in FIG. 2(a) and its corresponding IM is shown in FIG. 2(b). The IM areas that have been identified as high importance have a light shading, while dark areas represent those parts of the scene that are unlikely to attract attention.

Improvements to the prior art discussed above include improved segmentation, expansion of the spatial context features, improvements to the spatial and temporal feature processing algorithms, and improvements in the calibration and combining algorithms.

In the segmentation process a clipped version of the video frame is used as an input to avoid the effects that image borders have on later aspects of the model—a clip border on the order of 24 pixels works well. The Function Split uses color information as well as luminance information to determine when split/merge operations occur. As an example the L*u*v* color space may be used. The condition for splitting now is:

If: $((\text{variancelum}(R_i) > \text{th}_{splitlum})$ & $(\text{variancecol}(R_i) > \text{th}_{splitcol})$ & $(\text{size}(R_i) > \text{th}_{size}))$ Then: split into 4 quadrants where: $\text{variancecol}(R_i) = \text{SQRT}(\text{variance}(R_i(u^*))^2 + \text{variance}(R_i(v^*))^2)$ Values for thresholds may be: $\text{th}_{splitlum} = 250$ and $\text{th}_{splitcol} = 120$.

Additional changes also are made to the Function Merge. In order to avoid a problem where the segmentation produces large regions with a block-like shape, the merge threshold is adaptive depending upon block size through the use of a parameter $\text{scalefactor}_{merge}$ which increases when merging large regions, in particular when the two regions being merged are of similar size:

$\text{th}_{mergelumnew} = \text{scalefactor}_{merge} * \text{th}_{mergelumold}$ where:

$\text{scalefactor}_{merge} = (k_{merge} * \text{size}_{merge} + k_{reduc} + 1)/(\text{size}_{merge} + k_{merge} + k_{reduc})$ $\text{size}_{merge} = \max(k_{min} * (1/n)\text{ROOT}(\text{size}(R1)^n + \text{size}(R2)^n)/\text{size}(\text{frame})$ Values for the constant parameters may be: $k_{min} = 256$, $n = 0.25$, $k_{merge} = 3$, $k_{reduc} = 10$ and $\text{th}_{mergelumold} = 500$.

The same technique is used to modify the color merge threshold, $\text{th}_{mergecol}$ except the following parameters may be used: $k_{mincol} = 256$, $n_{col} = 0.5$, $k_{mergecol} = 1.5$, $k_{reduccol} = 0$ and $\text{th}_{mergecolold} = 120$.

The prior merge function merged low-texture regions too easily in comparison to areas of high texture. Therefore the mean luminance and color of the region is taken into consideration when determining whether or not to merge two regions. Both the mean color and mean luminance merge thresholds are interdependent, so the merge thresholds are calculated adaptively depending on the mean color and luminance of the region:

If: $((\Delta \text{col} < \text{th}_{\Delta col})$ & $(\text{col}_{max} > \text{th}_{BW}))$ Then: $\text{th}_{meanmergelumnew} = \text{th}_{meanmergelumold} + ((\text{th}_{\Delta col} - \Delta \text{col})/\text{th}_{\Delta col}) * (\text{th}_{\Delta lum\_max} - \text{th}_{meanmergelumold})$ where: $\Delta \text{lum} = |\text{gl}(R1) - \text{gl}(R2)|$ $\Delta \text{col} = \text{SQRT}((u^*_{R1} - u^*_{R2})^2 + (v^*_{R1} - v^*_{R2})^2)$ $\text{col}_{max} = \max(u^*_{R1}, u^*_{R2}, v^*_{R1}, v_{R2})$ where $\text{gl}(R_i)$ is the mean grey level of region $R_i$.

Values for the constants may be: $\text{th}_{\Delta col} = 14.0$, $\text{th}_{BW} = 7.0$ and $\text{th}_{\Delta lum\_max} = 70.0$.

Figure 3:
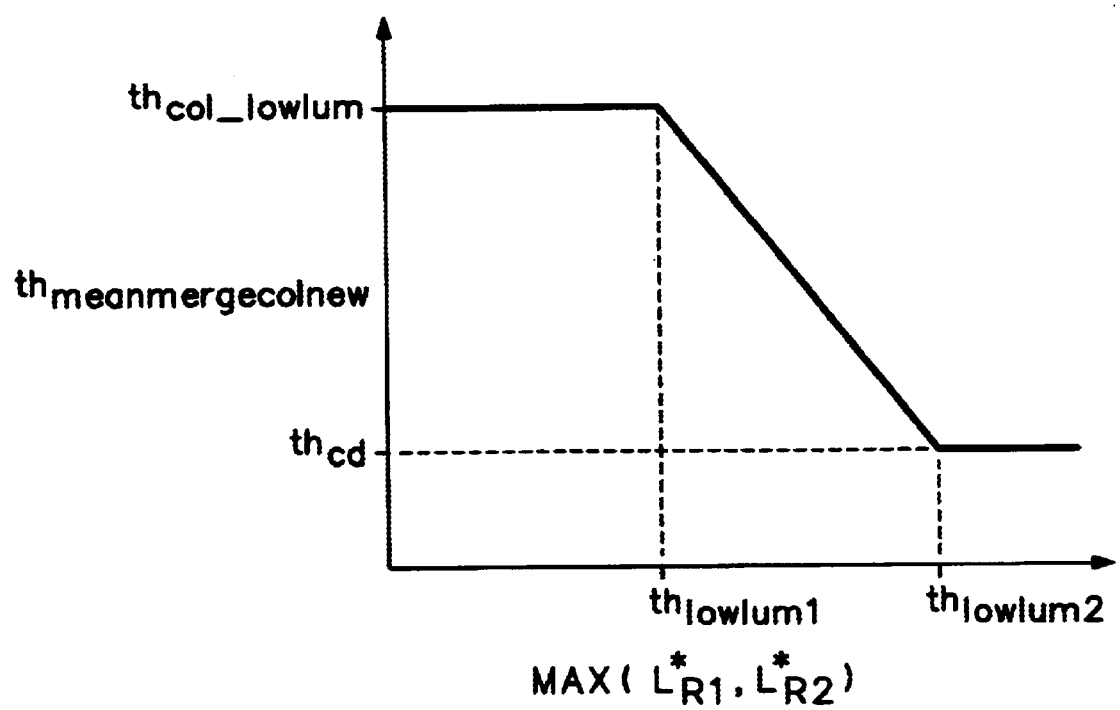
FIG. 3 is a graphic view illustrating the change of a threshold according to luminance for one of the spatial features according to the present invention.

The merge threshold for regions of low luminance is increased since, in low luminance areas, the color often takes on very high values. This is implemented as shown in FIG. 3. The values for the constants may be: $\text{th}_{lowlum1} = 10$, $\text{th}_{lowlum2} = 25$, $\text{th}_{col} = 14$ and $\text{th}_{col\_lowlum} = 40$.

Therefore the modified merge condition becomes:

If: $((\text{var}(\text{gl}_{R12}) < \text{th}_{mergelumnew})$ & $(\text{var}(\text{col}_{R12}) < \text{th}_{mergecolnew})$ & $(\Delta \text{lum} < \text{th}_{meanmergelumnew})$ & $(\Delta \text{col} < \text{th}_{meanmergecolnew}))$ OR $((\Delta \text{lum} < \text{th}_{lumlow})$ & $(\Delta \text{col} < \text{th}_{collow}))$ Then: combine two regions into one Else: keep regions separate End Values for the constants may be: $\text{th}_{lumlow} = 12$ and $\text{th}_{collow} = 5$. Changes also are made to the small region removal procedure to make the process independent of image resolution and to merge small regions with their most appropriate neighbor, as follows:

If: $\text{size}(R_i) < (1/k_{small}) * \text{size}(\text{frame})$

Then: merge $R_i$ with neighbor that has closest L* value

End where $k_{small}$ may be set to 4096. In this way the segmentation is made adaptive and becomes more robust.

The size feature for the IM is changed from a simple two threshold implementation to a four threshold implementation so that regions too small or too large are minimized instead of just those that are too small. Likewise the background feature is changed since the edge of the frame is eliminated by using the minimum of the number of pixels in the region that share a 4-connected border with another region or the number of pixels in the region that also border on the truncated edge. Also the location feature is changed to consider not just the center quarter of the frame, but also to consider various zones about the center with lesser weights depending upon the zone, decreasing from the center.

The original contrast importance was defined as the difference between the mean graylevel for the region $R_i$ less the mean graylevel for the regions that shared a 4-connected border with $R_i$. First the comparison of the mean graylevel of $R_i$ to its neighbors is based upon the absolute value for each neighbor so that neighbors with higher and lower mean graylevels than $R_i$ don't cancel each other. The area of influence that a neighbor has on the contrast is limited to a constant multiplied by the number of 4-connected neighboring pixels that the two regions have. This prevents large neighboring regions and regions with few neighboring pixels from exerting excessive influence on the contrast importance. Also the contrast importance is reduced for large regions by using a size scaling factor. Further to account for Weber and deVries-Rose effects the contrast at higher graylevels is reduced with respect to that at lower graylevels. Finally the contrast is normalized to the range 0–1 in an adaptive manner, depending upon the strength of the contrast within the frame. By doing this the contrast importance of a region with a certain contrast is reduced in frames that have regions of very high contrast and increased in frames where the highest contrast is small.

$I'_{cont}(R_i) = (\Sigma_{j=1-J}|gl(R_i)-gl(R_j)|* \min(k_{border}*B_{ij}, size(R_i)))/\Sigma_{j=1-J}\min(k_{border}*B_{ij}, size(R_i))$ where j=regions 1–J that share a 4-connected border with $R_i$, $k_{border}$ is a constant to limit the extent of influence of neighbors (set to 10, for example), and $B_{ij}$ is the number of pixels in $R_j$ that share a 4-connected border with $R_i$.

$I''_{cont}(R_i) = k_{sizescale}*I'_{cont}(R_i)$ where $k_{sizescale}$ varies with the size of region—large for small regions and low for larger regions.

$I'''_{cont}(R_i) = I''_{cont}(R_i)/\max(gl(R_i), th_{devries})^{powweber}$ where $th_{devries}$ is the graylevel of approximate start of deVries-Rose region (set to 50) and powweber is the non-linear Weber power (set to 0.3).

The normalization thresholds for I''' are calculated as:

$th_{cont1} = th_{base1weber} + (\min(I'_{cont}) - th_{base1weber})*th_{weight}$ $th_{cont2} = th_{base2webwe} + (\max(I''_{cont}) -$ $th_{base2weber})*th_{weight2high}, \quad \max(I''_{cont}) > th_{base2}$ or $= th_{base2weber} + (\max(I''_{cont}) -$ $th_{base2weber})*th_{weight2low}, \quad \max(I''_{cont}) \leq th_{base2}$ where:
$th_{base1weber} = th_{base1}/128^{powweber}$
$th_{base2weber} = th_{base2}/128^{powweber}$
$th_{base1} = 20$
$th_{base2} = 120$
$th_{weight1} = 0.5$
$th_{weight2high} = 0.25$
$th_{weight2low} = 0.75$ The shape feature is changed so that the shape importance is reduced in regions that have many neighboring regions so that such regions are not assigned a shape importance that is too high, and the shape importance is normalized to the range 0–1 using an adaptive normalization process.

The current invention adds color features to the visual attention model. RGB files are accepted as inputs and transformed to the L*u*v* color space. The color importance is calculated in a manner similar to the way in which the contrast importance is calculated since, in effect, the two features are performing a similar operation—one calculates the luminance contrast of a region with respect to its background while the other calculates the color contrast of a region with respect to its background. The calculation of color importance begins by calculating color contrasts separately for u* and v*.

$I_{u*}(R_i) = \Sigma_{j=1-J}|u*(R_i)-u*(R_j)|* \min(k_{border}*B_{ij}, size(R_j))/\Sigma_{j=1-J}\min(k_{border}*B_{ij}, size(R_j))$ $I_{v*}(R_i) = \Sigma_{j=1-J}|v*(R_i)-v*(R_j)|* \min(k_{border}*B_{ij}, size(R_j))/\Sigma_{j=1-J}\min(k_{border}*B_{ij}, size(R_j))$ Then the two color importance calculations are combined as the squareroot of the sum of the squares and reduced for large regions using a scaling factor. The color importance is normalized to the 0–1 range in an adaptive manner, depending upon the strength of the color importance within the frame. By doing this the color importance of a region with a certain color importance is reduced in frames that have regions of very high color contrast and increased in frames where the highest color contrast is small.

Figure 4:
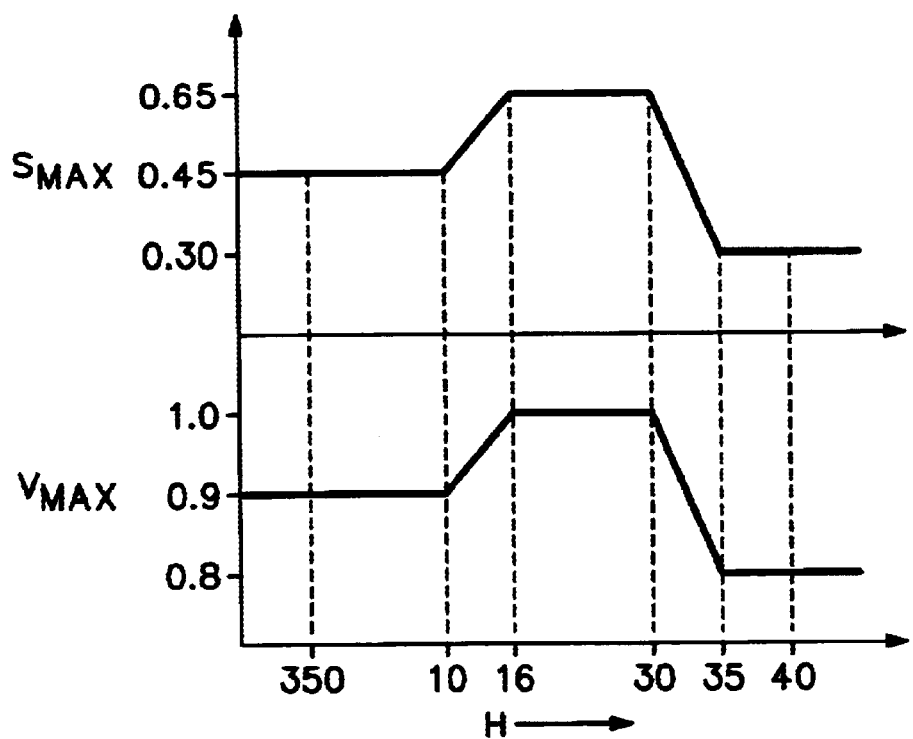
FIG. 4 is a graphic view illustrating the change in parameter values with hue for the skin spatial feature according to the present invention.

Finally a skin feature is added such that areas of skin are detected by their color. This is possible since the color of human skin, even of different races, falls into a narrow range of values. While other color spaces could be used, the hue-saturation-value (HSV) color space is chosen since human skin color is strongly clustered into a narrow range of HSV values. Each pixel is tested independently to determine whether or not its color matches that of skin. A pixel $x_{ij}$ is classified as skin if its HSV values $(h_{ij}, s_{ij}, v_{ij})$ fall within the following range:

$x_{ij}$=skin if $((H_{min} \leq h_{ij} \leq H_{max}) \& (S_{min} \leq S_{ij} \leq S_{max}) \& (V_{min} \leq V_{ij} \leq V_{max}))$ From a large database of test images, the best values for the classification thresholds are determined. Four of the thresholds may be represented by constants—$H_{min}=350°$, $H_{max}=40°$, $S_{min}=0.2$ and $V_{min}=0.35$. The other two thresholds, $S_{max}$ and $V_{max}$, are determined as H varies from the graph shown in FIG. 4.

For combining previously the spatial feature importance maps were squared and weighted equally to produce a final spatial IM, which was then scaled so that the region of highest importance had a value of 1.0. To ease the abrupt change between a region of high importance and a region of lower importance, block processing was performed, which involved assigning a maximum importance within an n×n block to each pixel within the block. However, to obtain an understanding of the relative influence of the different features, an eye tracking study was performed. The eye movements of a group of people were recorded as they viewed many different still images for approximately five seconds each and over several minutes of video. To determine which features influenced people's eye movements the most, the correlation between the people's fixation and each individual feature IM was calculated. This was done by calculating the percentage of fixations that landed on the regions classified by the feature as most important. The results of this showed that three of the spatial features—location, skin and foreground/background—had a very high correlation with the fixations. Three others—shape, color and contrast—had a lower but still significant influence on fixations, while size exerted an influence much lower than the other features. By using the fixation correlations measured from this experiment, a new feature weighting is used in the current invention:

$I_{spatial}(R_i) = \Sigma_{f=1-7}(w_f^{poww}*I_f(R_f)^{powf})$ where:

$w_f$ is the feature weight from the eye tracking experiment, i.e., (0.193 0.176 0.172 0.130 0.121 0.114 0.094) for (location, foreground/background, skin, shape, contrast, color, size), $pow_w$ is the feature weighting exponent to control the relative impact of $w_f$, i.e., 3.0 as an example, and $pow_f$ is the IM weighting exponent, i.e., 2.0 for all features as an example. The spatial IM is then scaled so that the region of highest importance has a value of 1.0, followed by block processing as before.

The resultant spatial IMs may be noisy from frame-to-frame, so to reduce this noisiness and improve the temporal consistency of the IMs a temporal smoothing operation is performed at the pixel level. Using a temporal window of (t−m, . . . , t+n) frames, the output IM at location (x,y) is taken as the $k^{th}$ highest IM at location (x,y) from the temporal window. Setting k>1 removes spurious regions of high importance. As an example n=m=5 frames and k=2.

Previously for the temporal importance map motion vectors for each block were calculated using a hierarchical block matching technique, with the resulting vectors being used directly to calculate the temporal importance. Low importance was given to areas of very low and very high motion, while areas of medium motion were assigned the highest importance. There were two major problems with this prior technique: (i) there was no way of distinguishing camera motion from true object motion so that the model failed when there was any camera motion (pan, tilt, zoom, rotate) while the video was being shot; and (ii) fixed thresholds were used when assigning importance to a particular motion, but these thresholds need to adapt to the motion in the video since the amount of motion varies greatly across different video scenes.

Figure 5:
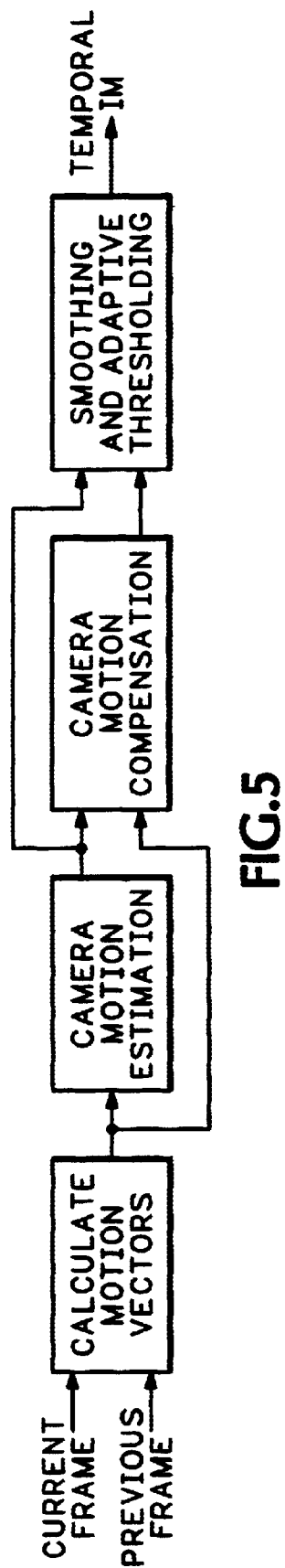
FIG. 5 is a block diagram view for generating a temporal importance map according to the present invention.

Referring now to FIG. 5 a block diagram of the temporal attention model is shown. As with the prior temporal process the current and previous frames are used in a hierarchical block matching process to calculate motion vectors. These motion vectors are used by a camera motion estimation algorithm to determine four parameters regarding the camera's motion—pan, tilt, zoom and rotate. These parameters are then used to compensate the motion vectors so that true object motion in the scene is captured. Since motion vectors in texturally flat areas are not reliable, the compensated motion vectors in these areas are set to zero. An 8×8 block is considered "flat" if the difference between the minimum and maximum graylevels within the block is lower than a threshold $th_{flat}$, such as 45. Finally the compensated motion vectors are converted into a measure of temporal importance via several steps.

The camera motion estimation algorithm detects severe jerkiness in the temporal motion, such as caused by scene cuts, 3:2 pulldown and temporal subsampling, i.e., frame drops. When these temporal discontinuities occur, motion information from the previous frame for which reliable motion information is available is used rather than using the motion information from the frame with the temporal discontinuity. The motion information from as far back as ten frames may be used if a temporal discontinuity is detected in the current frame. Then temporal smoothing is performed in a similar manner to the way it is performed on the spatial IM, as described above. Frames that are part of a scene cut or part of a different shot are not included in the temporal window. Next areas of low texture are assigned a temporal importance of zero, since motion vectors from these areas are unreliable. The "flat" determination is the same as described above except that the calculations are done over a temporal window of +/− one frame. Finally adaptive thresholding is used, the thresholds being calculated adaptively depending upon the amount of object motion in the scene. Scenes with few moving objects and with slow moving objects have lower thresholds than scenes with many fast moving objects, since human sensitivity is not masked by these numerous fast moving objects. An estimate of the amount of motion in a scene is obtained by taking the $m^{th}$ percentile, such as $98^{th}$ percentile, of the camera motion compensated motion vector map. Since the motion is measured in deg/sec, the monitor's resolution—pixel spacing and viewing distance—needs to be known. Typically pixel spacing is 0.25 mm and viewing distance is five picture heights for SDTV (Standard Definition TeleVision) viewing. In scenes where a fast moving object is being tracked by a fast pan or tilt movement, the objects' motion may be greater than a given threshold, and hence its temporal importance may be reduced to a value less than 1.0. To prevent this from occurring a special case is made. Finally block processing is performed on the 16×16 pixel level as is done for the spatial IM. Since the temporal IM is already at 8×8 pixel resolution, the maximum value for each 2×2 block is taken to obtain an overall 16×16 block size.

The combining of the spatial and temporal IMs is a linear weighting:

$$I_{total}=k_{comb}I_{spat}+(1-k_{comb})I_{temp}$$

A comparison of the viewer fixations for both the spatial and temporal IMs shows that the correlation is slightly higher for the spatial-only IMs in comparison to those of the temporal-only IMs. Therefore a value of $k_{comb}$ slightly higher than 0.5 is suggested, such as 0.6.

The above is all that may be done for basic integration of the spatial and temporal IMs. However the eye tracking studies indicate that in scenes with zooming, rotation or very high motion video, the viewers tend to focus their attention very strongly on the center of the screen. To assign further importance to central areas in these scenes, the following calculation may be performed:

$$mot_{zoomrot}=k_{z1}*motion_m+k_{z2}*zoom+k_{z3}*rotate+k_{z4}*error_{camera}$$

where:

$motion_m$ is the $m^{th}$ percentile of the camera motion compensated motion vector map, zoom and rotate are the frame's zoom and rotate parameters, $error_{camera}$ is output by the camera motion estimation algorithm, and the $k_{zi}$ are scaling constants. A central scaling constant $k_{central}$ is adjusted between two values according to the amount of $mot_{zoomrot}$ between a pair of thresholds. Then the new IM is:

$$I'_{total}=k_{central}I_{center}+(1-k_{central})I_{total}$$

Where the variable $error_{camera}$ is high, the accuracy of the IM may be reduced, so it may be useful to reduce the influence of the temporal IM in these cases. This may be done by increasing the value $k_{comb}$ as the error increases.

Finally the eye tracker studies show that people and faces are extremely strong attractors of attention. Since people are generally not completely stationary, at least not for any extended period of time, a special case may be made to increase the importance of skin areas that also are undergoing motion. This has two benefits: (i) objects falsely classified as skin by the skin feature are often background objects that do not move (sand, dried grass, brick walls), so these false positives are rejected if motion information is included; and (ii) faces often contain some areas of low texture and, since low texture areas are set to low importance so the low texture areas of faces are sometimes missed, by relaxing the low texture constraint for skin regions these areas are no longer missed and receive high importance. Therefore for each pixel:

If: $((I_{skin}>th_{skinmot1})$ & $(MV_{comp}>th_{skinmot2}))$
Then: $I_{total}=1.0$
End Thus the present invention provides an improved visual attention model of the type having spatial features to generate a spatial importance map and having a temporal importance map combined with the spatial importance map to produce an overall importance map for a frame, the improvement being an adaptive segmentation algorithm, adaptive algorithms for the spatial features as well as added spatial features, and an improved combinatorial algorithm based on eye movement studies to produce an improved overall importance map that is more robust.

What is claimed is:

1. An improved visual attention model of the type that segments a frame of a video sequence into regions for processing by a plurality of spatial features to produce a corresponding plurality of spatial importance maps, that compares the frame with a previous frame for processing to produce a temporal importance map, and that combines the spatial and temporal importance maps to produce a total importance map for the frame, wherein the improvement comprises the steps of:

adaptively segmenting the frame into the regions using color along with luminance;

processing the regions with a plurality of spatial features to produce the plurality of spatial importance maps;

processing the frame with the previous frame to produce the temporal importance map that is compensated for camera motion; and combining the spatial and temporal importance maps based upon a weighting function derived from eye movement studies to produce the total importance map for the frame.

2. The visual attention model as recited in claim 1 wherein the adaptively segmenting step comprises the steps of:

splitting the frame hierarchically into the regions based upon luminance variance, color variance and size of interim regions; and merging interim regions to form the regions when the mean luminance and color variances within the interim regions are less than respective adaptive thresholds and the change in luminance and change in color within the interim regions are less than respective thresholds or the luminance and color change within the interim regions are less than respective thresholds.

3. The visual attention model as recited in claim 2 wherein the adaptive segmenting step further comprises the step of clipping the borders of the frame prior to the splitting step.

4. The visual attention model as recited in claim 1 wherein the spatial features comprise at least two selected from the set consisting of size, background, location, contrast, shape, color and skin.

5. The visual attention model as recited in claim 4 wherein the processing step for the contrast spatial feature is based on absolute values for the mean graylevels of a region being processed and its neighboring regions that share a 4-connected border, is limited to a constant multiplied by the number of 4-connected neighboring pixels, and takes into account Weber and deVries-Rose effects.

6. The visual attention model as recited in claim 4 wherein the processing step for the color spatial feature calculates the color contrast of a region being processed with respect to its background.

7. The visual attention model as recited in claim 4 wherein the processing step for the skin spatial feature uses a narrow range of color values and respective thresholds for min and max values for each element of the color values.

8. The visual attention model as recited in claim 4 wherein the processing step for the size spatial feature comprises the step of implementing a four threshold algorithm so that regions too small and too large are minimized.

9. The visual attention model as recited in claim 4 wherein the processing step for the background spatial feature comprises the step of using a minimum of the number of pixels in a region that shares a four-connected border with another region or of the number of pixels in a region that also borders a truncated edge of the frame.

10. The visual attention model as recited in claim 4 wherein the processing step for the location spatial feature comprises the step of considering various zones about a central area of the frame with lesser weights per zone decreasing from the central area.

11. The visual attention model as recited in claim 4 wherein the processing step for the space spatial feature comprises the step of reducing shape importance in regions that have many neighboring regions.

12. The visual attention model as recited in claim 1 wherein the combining step comprises the steps of:

weighting each spatial importance map according to weights determined empirically from eye movement studies to produce a resultant spatial importance map;

smoothing the resultant spatial importance map from frame to frame using a temporal smoothing algorithm to reduce noise and improve temporal consistency to produce a spatial importance map; and combining the spatial importance map with the temporal importance map to produce the total importance map.

13. The visual attention model as recited in claim 12 wherein the step of combining the spatial importance map with the temporal importance map comprises the step of linear weighting the spatial importance and temporal importance maps, the linear weighting step using a constant determined from the eye movement studies.

14. The visual attention model as recited in claim 1 the temporal importance map processing step comprises the steps of:

calculating motion vectors for each block of the current frame using a hierarchical block matching algorithm;

estimating from the motion vectors parameters of camera motion;

compensating the motion vectors based upon the parameters of camera motion; and converting the compensated motion vectors into the temporal importance map.

15. The visual attention model as recited in claim 14 wherein the temporal importance map processing step further comprises the step of determining a flatness for each block so that motion vectors in texturally flat errors are set to zero in the compensated motion vectors prior to the converting step.

16. The visual attention model as recited in claim 14 further comprising the step of calculating an adaptive threshold for assigning importance to a particular motion of a region over a temporal window.

17. The visual attention model as recited in claim 16 wherein the adaptively calculating step includes the steps of:

assigning a lower threshold value as the adaptive threshold when there are few and slow moving regions in the frame: and assigning a higher threshold value as the adaptive threshold when there are many and fast moving regions in the frame.

18. The visual attention model as recited in claim 14 further comprising the step of assigning further importance in the total importance map to a central area of the frame when the camera motion parameters indicate camera motion selected from the group consisting of zoom and pan.

19. The visual attention model as recited in claim 14 further comprising the step of assigning further importance in the total importance map to a central area of the frame when there is very high motion the video sequence.

20. The visual attention model as recited in claim 14 further comprising the step of assigning further importance in the total importance map to skin areas that are undergoing motion.

* * * * *